United States Patent
Xiao et al.

(10) Patent No.: US 10,713,103 B2
(45) Date of Patent: Jul. 14, 2020

(54) LIGHTWEIGHT APPLICATION PROGRAMMING INTERFACE (API) CREATION AND MANAGEMENT

(71) Applicant: International Business Machines Corporation, Armonk, NY (US)

(72) Inventors: Ping Xiao, P.R (CN); Guo Qiang Li, Haidian District (CN); Xue Yong Zhang, Haidian District (CN); Guan Jun Liu, HaiDian District (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/159,912

(22) Filed: Oct. 15, 2018

(65) Prior Publication Data
US 2020/0117522 A1 Apr. 16, 2020

(51) Int. Cl.
G06F 9/54 (2006.01)

(52) U.S. Cl.
CPC .................................. *G06F 9/547* (2013.01)

(58) Field of Classification Search
CPC ...................................................... G06F 9/547
See application file for complete search history.

(56) References Cited

U.S. PATENT DOCUMENTS

| 6,253,257 | B1 | 6/2001 | Dundon |
| 9,396,091 | B2 | 7/2016 | Bally et al. |
| 9,483,313 | B2 | 11/2016 | Bouw et al. |
| 2012/0072465 | A1 | 3/2012 | McGowan et al. |
| 2015/0222504 | A1 | 8/2015 | Srivastava |
| 2017/0068577 | A1 | 3/2017 | Ashokan et al. |
| 2018/0089005 | A1* | 3/2018 | Green ..................... G06F 9/547 |
| 2019/0034210 | A1* | 1/2019 | Palladino ............ G06F 9/44526 |

OTHER PUBLICATIONS

"Method and system for optimal self-adjusting API definitions." IP.com, https://priorart.ip.com/IPCOM/000238004. pp. 3.
Xu et al., "Lightweight and Adaptive Service API Performance Monitoring in Highly Dynamic Cloud Environment." https://ieeexplore.ieee.org/document/8034965/. pp. 3.

* cited by examiner

*Primary Examiner* — Charles E Anya
(74) *Attorney, Agent, or Firm* — Cantor Colburn LLP; Teddi Maranzano

(57) ABSTRACT

Examples of techniques lightweight application programming interface (API) creation and management are described herein. An aspect includes sending an API response to a client based on a first API request from the client. Another aspect includes receiving a first data consumption record corresponding to the API response, wherein the first data consumption record indicates an amount of data that was discarded from the API response by the client. Another aspect includes determining, based on the first data consumption record, a lightweight API. Another aspect includes sending the lightweight API to the client based on a second API request from the client.

17 Claims, 6 Drawing Sheets

LIGHTWEIGHT APPLICATION PROGRAMMING INTERFACE (API) CREATION AND MANAGEMENT

BACKGROUND

The present techniques relate to computer systems. More specifically, the techniques relate to the creation and management of a lightweight application programming interface (API) in a computer system.

An application programming interface (API) is computer software that allows two computer software programs to communicate with each other. The API may define the correct way for a software developer to write a program that requests services from an operating system (OS) or another underlying application. APIs may be implemented using function calls that return specified data. The required syntax for a function call may be described in the documentation of the application being called. APIs may include a specification that describes how information is exchanged between programs, which may take the form of a request for processing and a return of the necessary data, and a software interface that is written to the specification. Software that wants to access the features and capabilities of an API may issue requests to the API according to the API specification.

SUMMARY

According to an embodiment described herein, a system can include a processor to send an application programming interface (API) response to a client based on a first API request from the client. The processor can also receive a first data consumption record corresponding to the API response, wherein the first data consumption record indicates an amount of data that was discarded from the API response by the client. The processor can also determine, based on the first data consumption record, a lightweight API. The processor can also send the lightweight API to the client based on a second API request from the client.

According to another embodiment described herein, a method can include sending, via a processor, an application programming interface (API) response to a client based on a first API request from the client. The method can also include receiving, via the processor, a first data consumption record corresponding to the API response, wherein the first data consumption record indicates an amount of data that was discarded from the API response by the client. The method can also include determining, via the processor, based on the first data consumption record, a lightweight API. The method can also include sending, via the processor, the lightweight API to the client based on a second API request from the client.

According to another embodiment described herein, an apparatus can include a processor to send an application programming interface (API) response to a client based on a first API request from the client. The apparatus can also receive a first data consumption record corresponding to the API response, wherein the first data consumption record indicates an amount of data that was discarded from the API response by the client. The apparatus can also determine, based on the first data consumption record, a lightweight API. The apparatus can also send the lightweight API to the client based on a second API request from the client.

DETAILED DESCRIPTION

Figure 1:
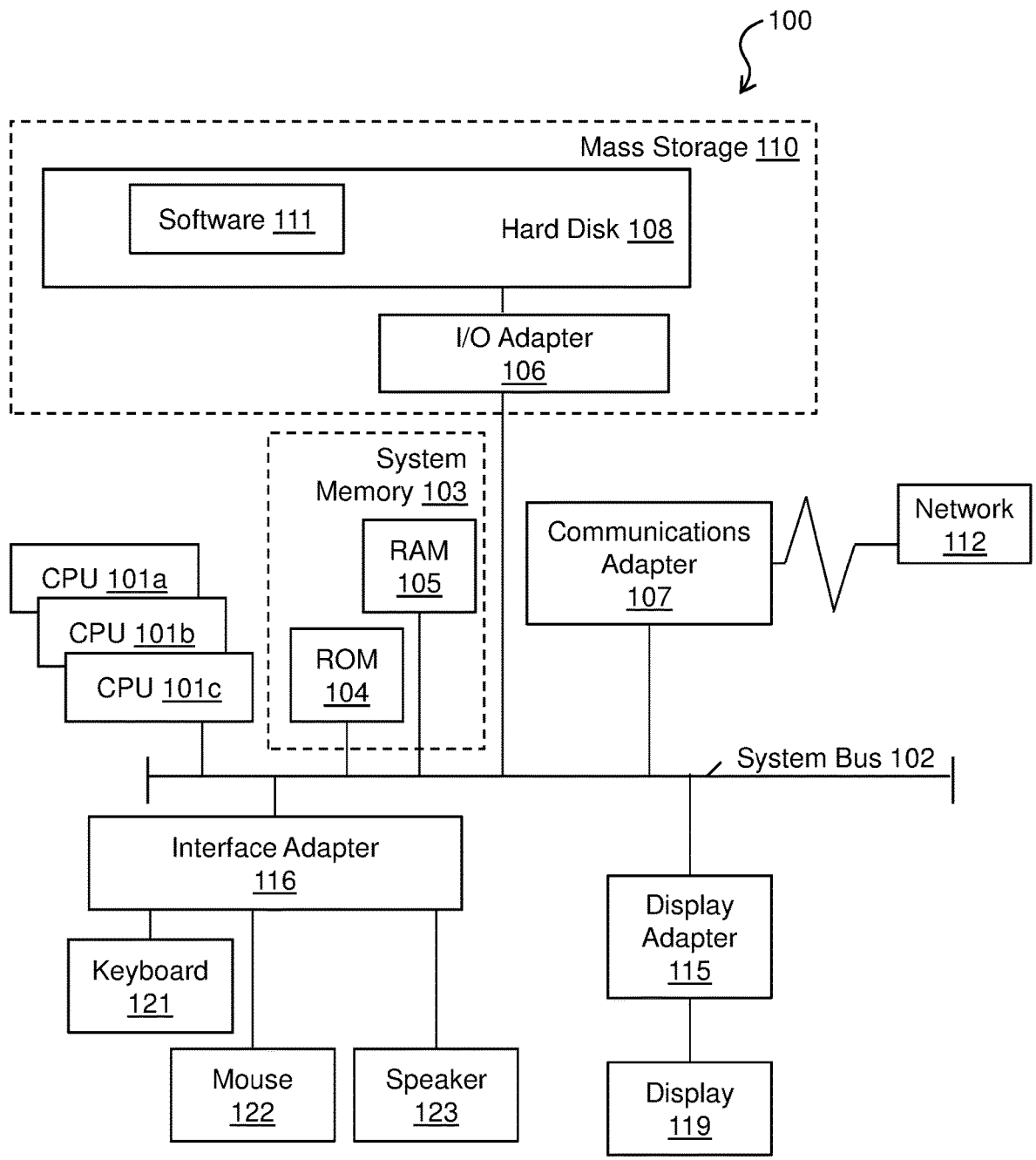
FIG. 1 is a block diagram of an example computer system for lightweight API creation and management.

Embodiments of lightweight API creation and management are provided, with exemplary embodiments being discussed below in detail. An existing API may not be sufficiently flexible to meet the specific needs of the various clients that make access the API. For example, a general API may be provided to a number of clients. The general API may include functions that return relatively large amounts of data. Not all of the returned data may be required by a particular client. Therefore, the client may analyze a full API response to determine the data that is required by the client, then discard the rest of the API response, i.e., the data that is not required by the client. A full API response may be referred to as a heavy API in various embodiments.

Embodiments of lightweight API creation and management may collect data regarding the ratio of API responses that are required data versus data that is discarded, and construct a lightweight API response that omits some or all of the non-required data. A ratio of the data consumed by the client versus the total transmitted data in an API response may be determined in some embodiments. The lightweight API may then be sent in response to future API requests. One or more lightweight APIs may be created; in some embodiments, different lightweight APIs may be created for different clients, and different lightweight APIs may be created for different software branches in a computer program that executes on a client in some embodiments. In further embodiments, a single lightweight API may be used for different instances of the same software program that are executing on different clients. A data consumption threshold may trigger the creation of a lightweight API in some embodiments. The data consumption threshold may be dynamically calculated on a per-client basis in some embodiments.

In some embodiments, data regarding the specific API fields that are required by a client may be collected and analyzed, in order to determine which API data to include in the lightweight API. Aspect-oriented programming (AOP) may be used to determine the specific API fields. In some embodiments, the API usage data may be organized based on branch or software context data that is collected on the client side, and transmitted to the API server. The data may be transmitted to the server at a predetermined time interval in some embodiments. The client may collect data regarding the particular fields that are used by each branch in the software, and generate a report for each predetermined time interval; the report may then be provided to the server. A heat map may be generated for API responses across a plurality of branches to identify the fields that will be included in the lightweight API in some embodiments.

After a lightweight API is created, the usage of the lightweight API may be tracked, and, if the usage of the lightweight API falls below a usage threshold, the lightweight API may be deleted in some embodiments. In further embodiments, a first-level lightweight API may be further reduced to generate a second-level lightweight API that includes fewer data fields than the first-level lightweight API. Inherited authentication may be used to provide client access across the heavy API, first-level lightweight API, and second-level lightweight API in some embodiments, e.g., if the client has access to the heavy API, the client will also have access to the first-level lightweight API and second-level lightweight API.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 516 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
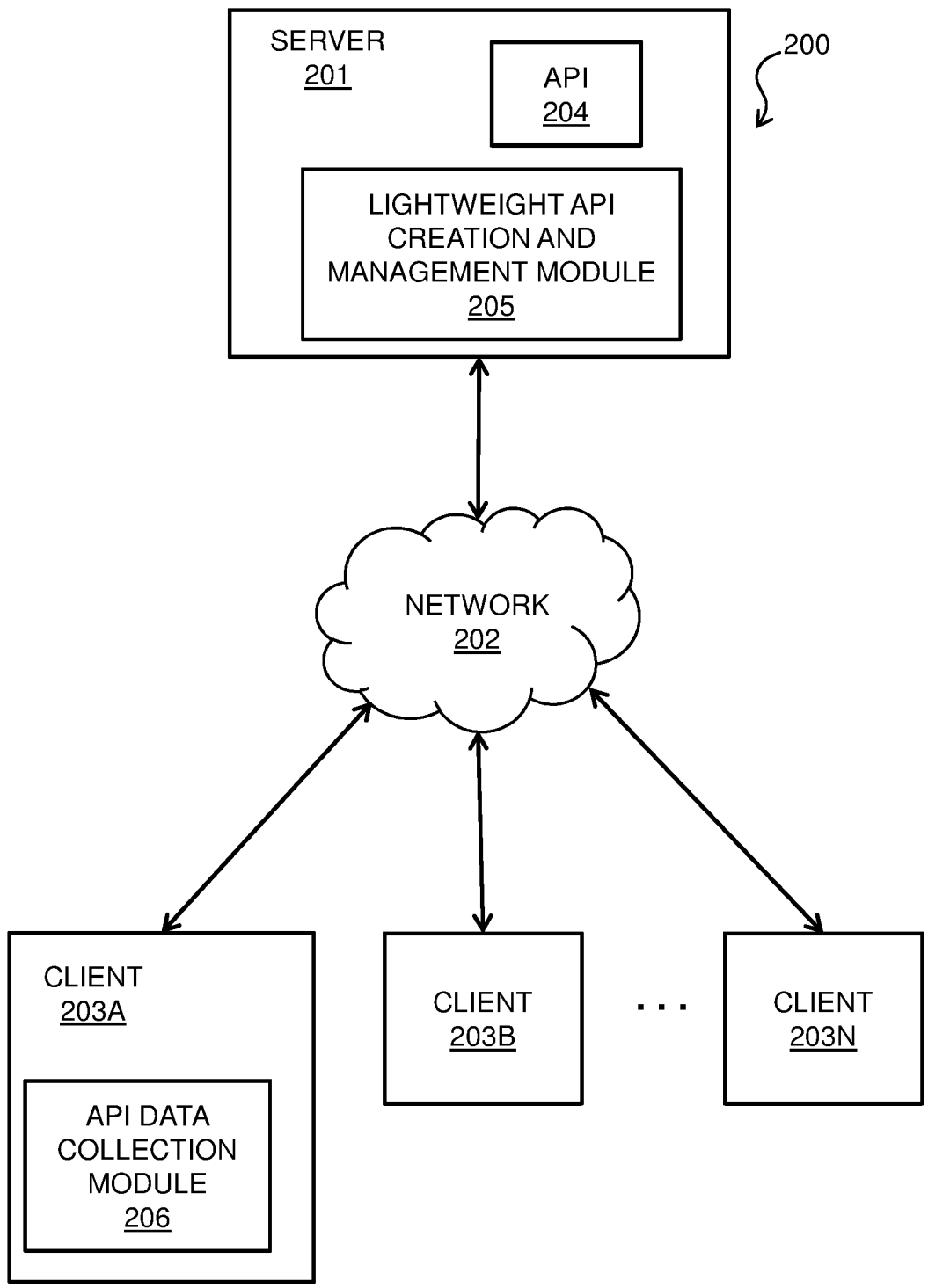
FIG. 2 is a block diagram of an example system for lightweight API creation and management.

FIG. 2 is a block diagram of an example system 200 for lightweight API creation and management. System 200 includes a server 201, which may be a computer system such as the computer system 100 of FIG. 1 in some embodiments. Server 201 hosts an API 204, and a lightweight API creation and management module 205. Server 201 is connected via a network 202 to a plurality of clients 203A-N. Clients 203A-N may each be a computer system such as the computer system 100 of FIG. 1 in some embodiments.

Software executes on each of clients 203A-N, and that software may issue requests from each of clients 203A-N to API 204 on server 201 via network 202. As shown in FIG. 2, client 203A includes an API data collection module 206. As the software that is executed on client 203A issues requests to the API 204 on the server 201 via the network 202, the server 201 may respond to these requests with a full API response, or a lightweight API if a lightweight API has been created that is appropriate for the particular client request.

The API data collection module 206 in client 203A collects data consumption records that indicate the total amount of data received in API responses by client 203A from the API 204, and the amount of data in the API response that was actually used by the requesting software. The data consumption records collected by the API data collection module 206 is provided via network 202 to lightweight API creation and management module 205 in the server 201. The lightweight API creation and management module 205 analyzes the data consumption records received from the API data collection module 206, and creates a lightweight API based on the analysis. The lightweight API may then be sent to the client 203A in response to future requests. Each client of clients 203A-N may include a respective API data collection module such as API data collection module 206, and the lightweight API creation and management module 205 may create and maintain one or more lightweight APIs for each of the clients 203A-N based on data consumption records from the particular client's API data collection module 206.

It is to be understood that the block diagram of FIG. 2 is not intended to indicate that the system 200 is to include all of the components shown in FIG. 2. Rather, the computer system 100 can include any appropriate fewer or additional components not illustrated in FIG. 2 (e.g., additional servers, clients, APIs, modules, etc.). The network 202 may be any appropriate type of network, and may be a hybrid network including multiple different types of connected networks in various embodiments. Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
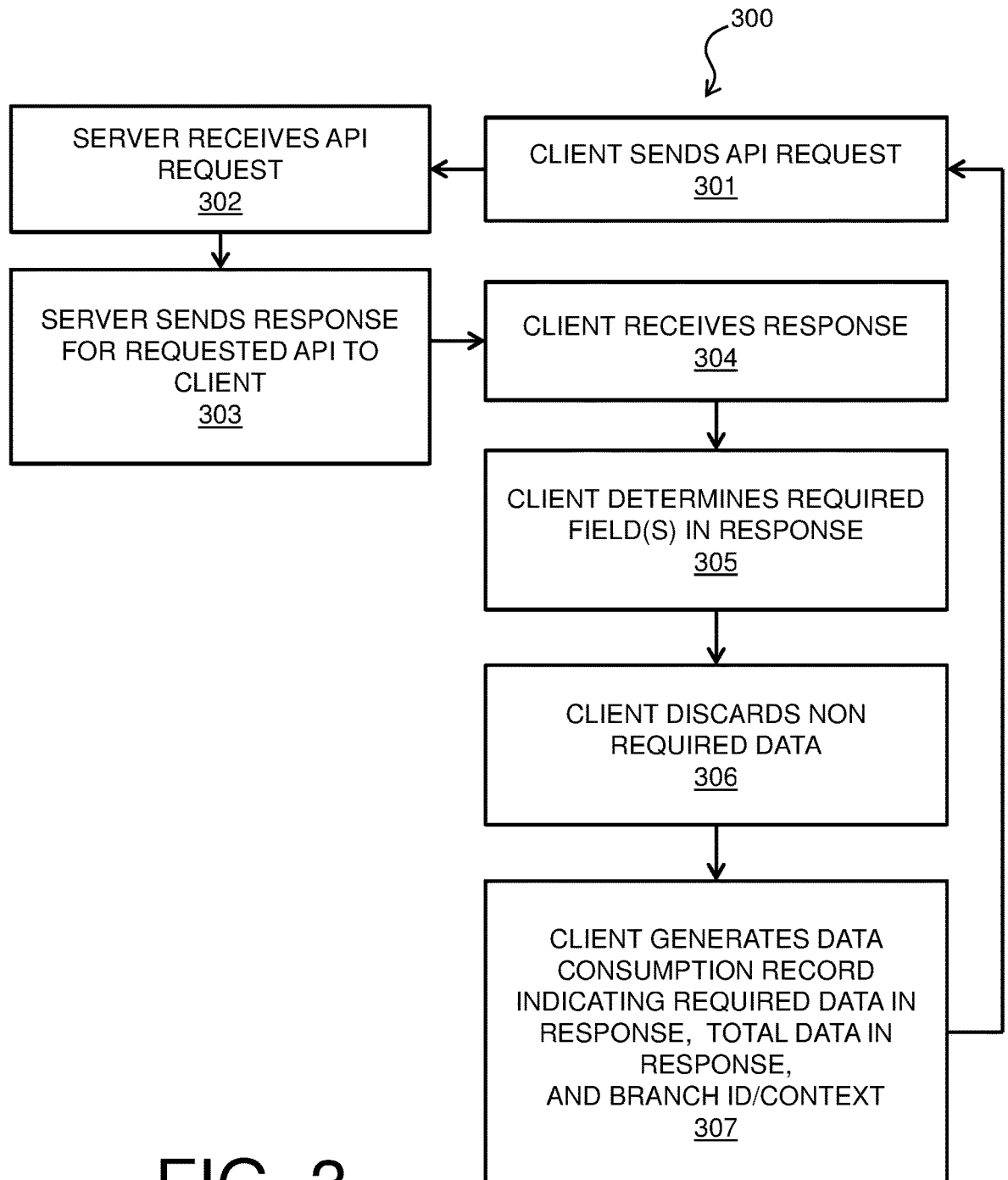
FIG. 3 is a process flow diagram of an example method for lightweight API creation and management.

FIG. 3 is a process flow diagram of an example method 300 for lightweight API creation and management. The method 300 can be implemented with any suitable computing device, such as the computer system 100 of FIG. 1, and is discussed with respect to system 200 of FIG. 2. In block 301, as software is executing on a client 203A, a software instruction including an API call sends an API request to an API 204 located on a server 201 via a network 202. In block 302, the server 201 receives the API request that was sent in block 301. In block 303, the server 201 sends an API response to the client 203A. The API response that is sent by the server 201 in block 303 may, in various embodiments, be a heavy API, a first-level lightweight API, a second-level lightweight API, or any appropriate additional number of levels. The determination of what API response to send is discussed in further detail with respect to FIGS. 4-6.

In block 304, the client 203A receives the API response that was sent in block 303. In block 305, the client 203A determines the particular fields in the response that are required by the requesting software, and, in block 306, discards any non-required data from the response. In block 307, the API data collection module 206 generates and stores a data consumption record for the API response. The data consumption record indicates, in various embodiments, any of the total data in the response, the required data in the response, the discarded data in the response, and branch identifier and/or context information of the software instruction that that generated the API request in block 301 that resulted in the API response in block 304. In some embodiments, the data consumption record may include the identifiers of particular fields in the response that were required data. From block 307, execution of software continues on client 203A, and flow proceeds back to block 301 as additional software instructions are encountered that result in API calls. Each API call in the software that is executed on client 203A is processed according to blocks 301-307 of FIG. 3.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
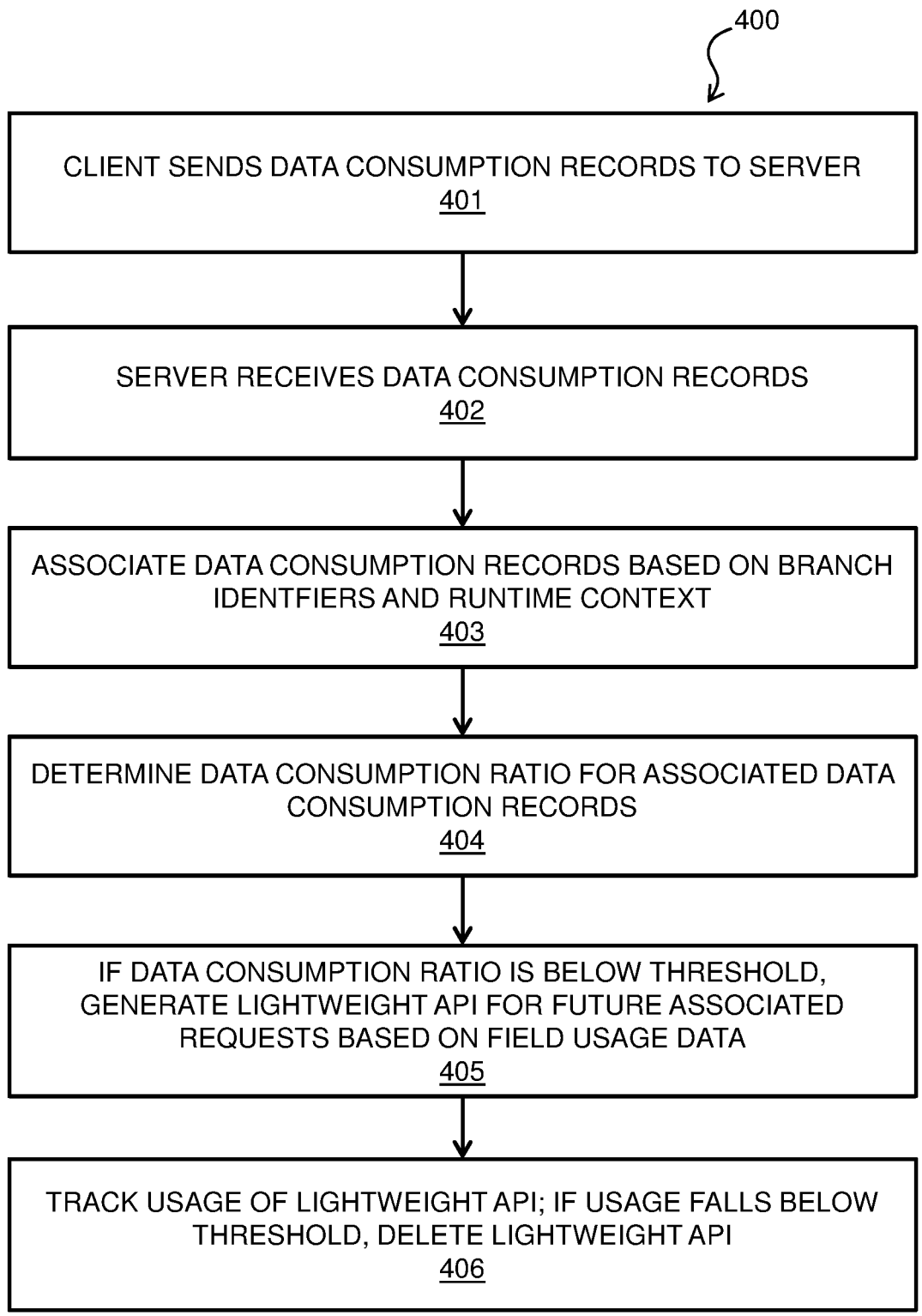
FIG. 4 is a process flow diagram of another example method for lightweight API creation and management.

FIG. 4 is a process flow diagram of an example method 400 for lightweight API creation and management. The method 400 can be implemented with any suitable computing device, such as the computer system 100 of FIG. 1, and is discussed with respect to system 200 of FIG. 2. Method 400 is performed in conjunction with method 300 of FIG. 3. In block 401, client 203A sends data consumption records that were generated and stored by API data collection module 206 in block 307 of FIG. 3 to lightweight API creation and management module 205 in server 201 via network 202. In some embodiments, a plurality of data consumption records may be sent in block 401, each data consumption record corresponding to a respective software instruction that generated an API request. In other embodiments, a report based on the collected data consumption records may be sent in block 401. The data consumption records may be transmitted from client 203A to server 201 in batches at predetermined time intervals in some embodiments.

In block 402, the lightweight API creation and management module 205 in server 201 receives the transmitted data consumption records. In block 403, the lightweight API creation and management module 205 determines data consumption records that are associated based on branch identifiers and/or runtime context information that are stored in the data consumption records. For example, a particular software instruction that was executed on client 203A may have been repeatedly executed in the same branch of a software program, such that there is a data consumption record for each execution of the software instruction. Data consumption records associated with the same branch identifier and/or runtime context information may be associated with one another by the lightweight API creation and management module 205 in some embodiments.

In block 404, a data consumption ratio is determined across associated records. The data consumption ratio may be, in some embodiments, the amount of data actually used by the software instruction versus the total amount of data in the API response. In an embodiment, a heavy API response that was received by the client 203A may include eight fields, and the client 203A may have only used two of those fields, giving an example data consumption ratio of 0.25. The data consumption ratio may be calculated in any appropriate manner in various embodiments. In block 405, if the data consumption ratio is below a predetermined threshold, a lightweight API is generated for future associated API requests. In some embodiments, the lightweight API is generated based on a heat map of the API that is determined based on field usage information in the data consumption records. An example API heat map is discussed below with respect to FIG. 6.

In some embodiments, the lightweight API creation and management module 205 may maintain separate, respective lightweight APIs for different clients. In other embodiments, a single lightweight API may be used by different instances of the same software that are executing on different clients. In further embodiments, different clients may set different respective data consumption thresholds that are used in block 405 to determine whether to generate a lightweight API.

In block 406, usage of the lightweight API is tracked by the lightweight API creation and management module 205. In some embodiments, if usage of the lightweight API falls below a predetermined usage threshold, the lightweight API may be deleted.

During execution of the software on client 203A, methods 300 and 400 continue to be performed in system 200. Data consumption records are generated corresponding to the lightweight API in block 307 of FIG. 3 and sent to the server 201 in block 401 of FIG. 4. Method 400 may be triggered at predetermined time intervals, when the data consumption records are transmitted from the client 203A to server 201. In block 405, the original lightweight API (e.g., first-level lightweight API) may be further refined into a second-level lightweight API that includes fewer fields than the first-level lightweight API, based on the data consumption records and the data consumption ratio. In some embodiments, a second-level data consumption ratio may be used to determine whether to create the second-level lightweight API. Access by the software that is executing on client 203A to the heavy API 204, the first-level lightweight API, and the second-level lightweight API may be determined by inheritance, i.e., if the software has access to the full API, the software also has access to the first-level lightweight API and the second-level lightweight API.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
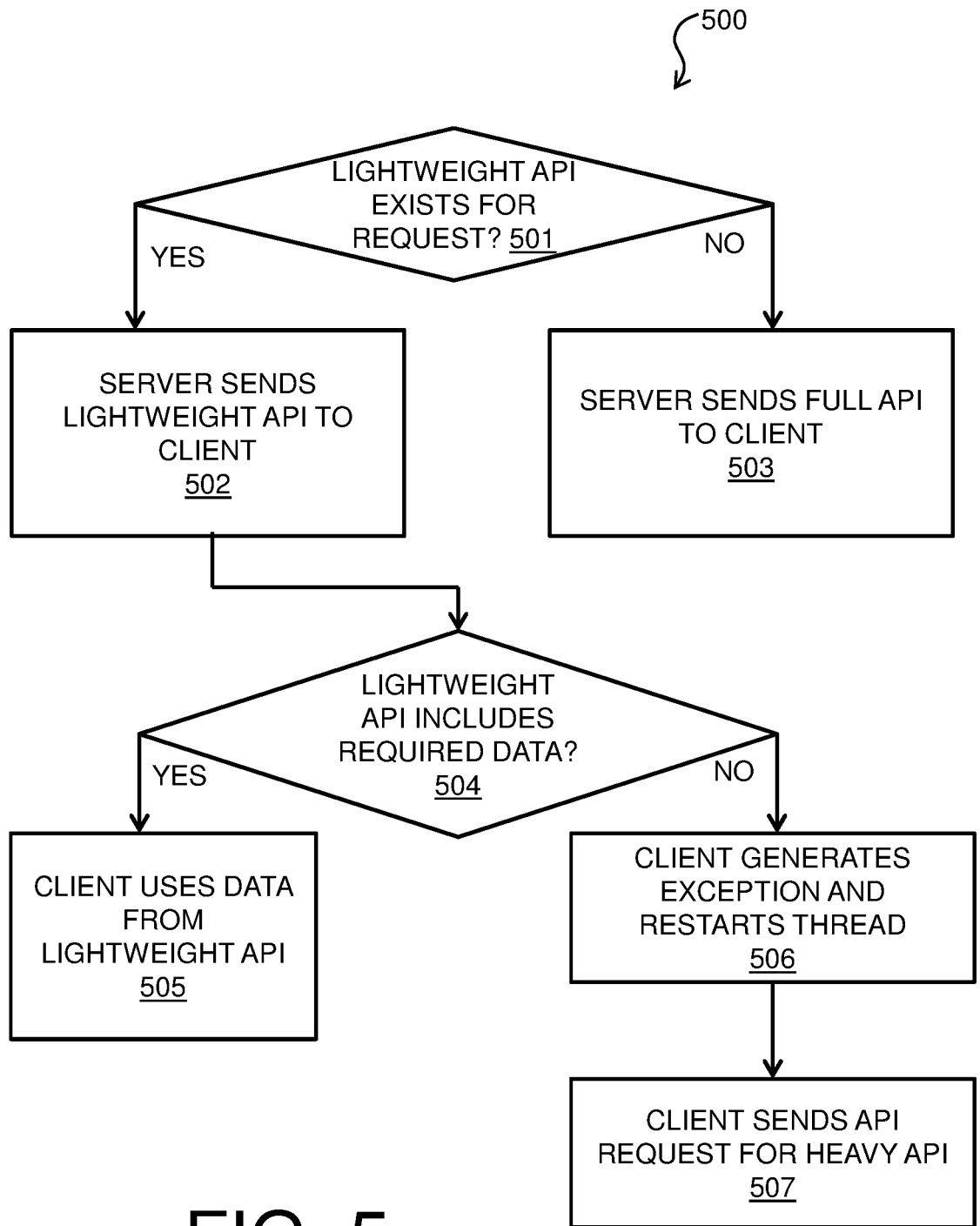
FIG. 5 is a process flow diagram of another example method for lightweight API creation and management.

FIG. 5 is a process flow diagram of an example method 500 for lightweight API creation and management. The method 500 can be implemented with any suitable computing device, such as the computer system 100 of FIG. 1, and is discussed with respect to system 200 of FIG. 2. Method 500 may correspond to blocks 303, 304, and 305 of method 300 of FIG. 3 in some embodiments. In block 501, a software instruction in software that is executing on client 203A sends an API request to API 204 on server 201 via network 202, and the lightweight API creation and management module 205 determines whether to send a lightweight API to the client 203A in response to the API request. The determination may be made based on whether a lightweight API exists for the branch identifier and/or a runtime context associated with the software instruction that generated the API request. The determination may further be made based on an identifier of the client 203A, and an identifier of the software program that is executing on the client 203A that generated the API request. It may also be determined in block 501 whether the API request is specifically requesting the heavy API; this is discussed below with respect to block 507. If it is determined that no lightweight API associated with the API request exists in block 501, or if the API request is a request for the heavy API, flow proceeds to block 503, in which the server 201 sends the heavy API response to the client 203A, and method 500 ends. If it is determined in block 501 that a lightweight API does exist for the API request and the API request is not a request for the full API, flow proceeds to block 502, and the server 201 sends the lightweight API to the client 203A. Tracking of the usage of the lightweight API, as performed in block 406 of FIG. 4, may be performed based on the sending of the lightweight API as is performed in block 502. For example, the lightweight API creation and management module 205 may keep a record of a number of times the lightweight API has been sent in response to API requests over a period of time, and, if the number drops below a usage threshold, the lightweight API may be deleted.

From block 502, flow proceeds to block 504. In block 504 the client 203A determines whether the lightweight API response includes all of the data that is required by the software instruction that generated the API request. If it is determined in block 504 that the lightweight API response does include the required data, flow proceeds to block 505, in which the client 203A uses the required data that was included in the response, and method 500 ends. If it is determined in block 504 that the lightweight API does not include the required data, flow proceeds from block 504 to block 506, and the client 203A generates an API request exception and restarts the software thread that made the request. In block 507, the software instruction is executed again, and the client 203A issues an API request for the heavy API to the server 201 based on the API request exception. The API request exception for the heavy API may include an identifier that prevents determining that the lightweight API should be sent in block 501.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
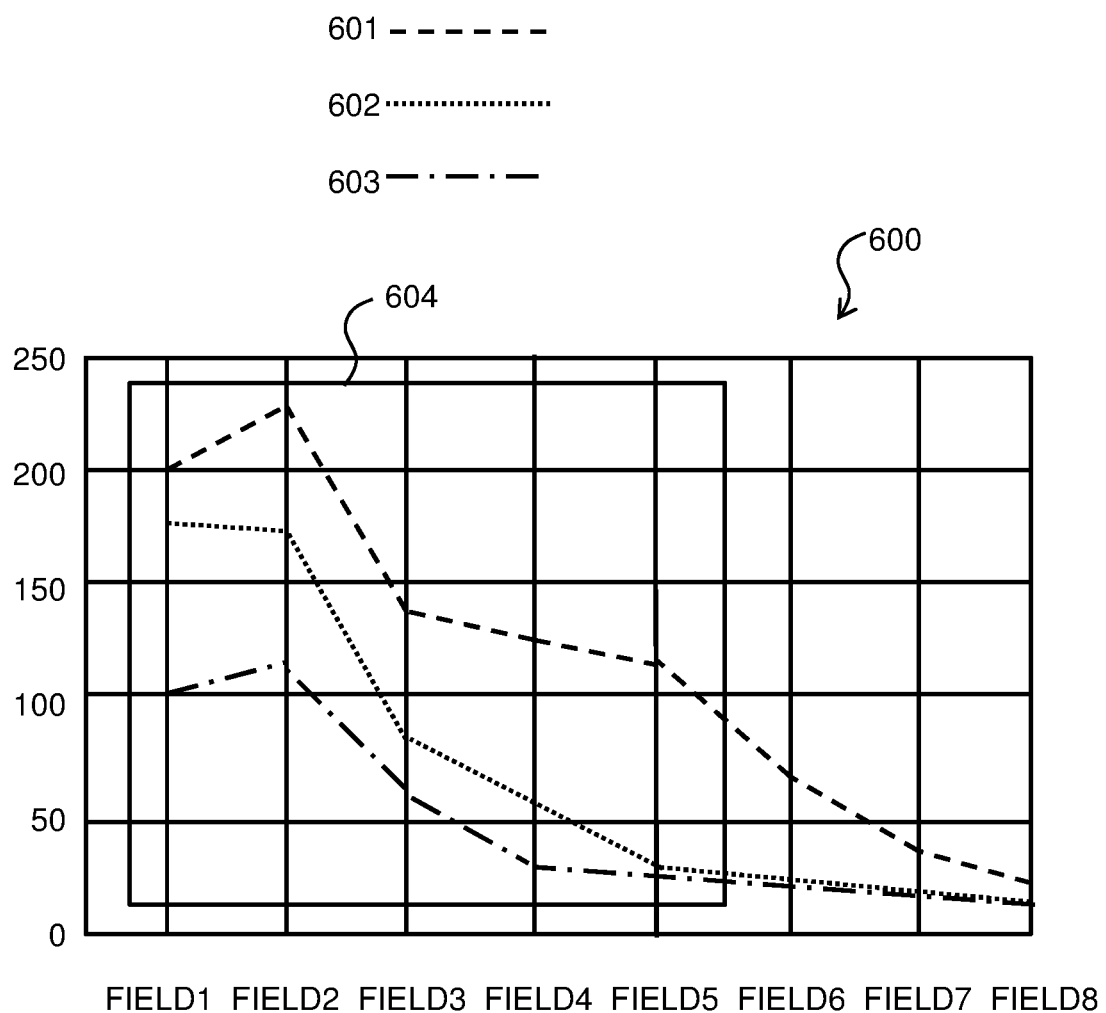
FIG. 6 is an example graph for lightweight API creation and management.

FIG. 6 is an example heatmap 600 for lightweight API creation and management. A heatmap 600 as shown in FIG. 6 may be generated in, for example, block 404 of FIG. 4 by lightweight API creation and management module 205. The API heatmap 600 shows a plot of a number of API requests for which a field was required data (Y-axis) for each field in an API (fields 1 to 8, X-axis) for 3 different software branches 601, 602, and 603, over a time period. The data consumption records, as are generated in block 307 of FIG. 3, include branch identifiers that are used to generate API heatmap 600. As shown in FIG. 6, for branch 601, field 1 was required data for approximately 200 API requests; field 2 was required data for approximately 225 API requests, and field 3 was required data for approximately 140 API requests. An example threshold box 604 may be used to generate the lightweight API. The threshold box 604 determines that fields 6, 7, and 8 may be left out of the lightweight API because fields 6, 7, and 8 have usage numbers that are below a predetermined threshold. The lightweight API that is generated based on API heatmap 600 may be used for API requests for branches 601, 602, and 603 in some embodiments; in other embodiments, separate lightweight APIs may be generated for different branches. A threshold box such as threshold box 604 may be determined based on the data consumption threshold. In various embodiments, the lightweight API creation and management module 205 may maintain a single data consumption threshold, or a client may specify a respective data consumption threshold for use in generating a lightweight API for the particular client.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
send, by a server, an application programming interface (API) response to a client based on a first API request from the client;
receive, by the server, a first data consumption record corresponding to the API response, wherein the first data consumption record indicates an amount of data that was discarded from the API response by the client;
determine, by the server, based on the first data consumption record, a lightweight API; and
send, by the server, the lightweight API to the client based on a second API request from the client;
wherein one or more data fields that are included in the API response are not included in the lightweight API, and wherein the lightweight API is determined based on a ratio of required data in the API response to the amount of data that was discarded from the API response being below a data consumption threshold.

2. The system of claim 1, wherein the processor is to:
receive, by the server, a plurality of data consumption records from the client, each of the plurality of data consumption records being associated with a respective API response;
determine, by the server, a subset of the plurality of data consumption records that are associated with a branch identifier; and
determine, by the server, the lightweight API based on the determined subset of the plurality of data consumption records.

3. The system of claim 2, wherein the processor is to:
send, by the server, the lightweight API to the client based on the second API request being associated with the branch identifier.

4. The system of claim 1, wherein the processor is to:
receive, by the server, a second data consumption record corresponding to the lightweight API, wherein the second data consumption record indicates an amount of data that was discarded from the lightweight API by the client;
determine, by the server, based on the second data consumption record, a second-level lightweight API, wherein one or more data fields that are included in the lightweight API are not included in the second-level lightweight API; and
send, by the server, the second-level lightweight API to the client base on a third API request from the client.

5. The system of claim 1, wherein the processor is to:
based on the lightweight API not including required data, receive, by the server, an API request exception corresponding to the second API request from the client; and
send, by the server, a heavy API response to the client based on the API request exception.

6. The system of claim 1, wherein the processor is to:
track, by the server, a usage of the lightweight API; and
based on the usage of the lightweight API being below a usage threshold, delete, by the server, the lightweight API.

7. A computer-implemented method, comprising:
sending, by a server, an application programming interface (API) response to a client based on a first API request from the client;
receiving, by the server, a first data consumption record corresponding to the API response, wherein the first data consumption record indicates an amount of data that was discarded from the API response by the client;
determining, by the server, based on the first data consumption record, a lightweight API; and
sending, by the server, the lightweight API to the client based on a second API request from the client;
wherein one or more data fields that are included in the API response are not included in the lightweight API, and wherein the lightweight API is determined based on a ratio of required data in the API response to the amount of data that was discarded from the API response being below a data consumption threshold.

8. The computer implemented method of claim 7, comprising:
receiving, by the server, a plurality of data consumption records from the client, each of the plurality of data consumption records being associated with a respective API response;
determining, by the server, a subset of the plurality of data consumption records that are associated with a branch identifier; and
determining, by the server, the lightweight API based on the determined subset of the plurality of data consumption records.

9. The computer-implemented method of claim 8, comprising:
sending, by the server, the lightweight API to the client based on the second API request being associated with the branch identifier.

10. The computer implemented method of claim 7, comprising:
receiving, by the server, a second data consumption record corresponding to the lightweight API, wherein the second data consumption record indicates an amount of data that was discarded from the lightweight API by the client;

determining, by the server, based on the second data consumption record, a second-level lightweight API, wherein one or more data fields that are included in the lightweight API are not included in the second-level lightweight API; and sending, by the server, the second-level lightweight API to the client base on a third API request from the client.

11. The computer implemented method of claim 7, comprising:

based on the lightweight API not including required data, receiving, by the server, an API request exception corresponding to the second API request from the client; and sending, by the server, a heavy API response to the client based on the API request exception.

12. The computer implemented method of claim 7, comprising:

tracking, by the server, a usage of the lightweight API; and based on the usage of the lightweight API being below a usage threshold, deleting, by the server, the lightweight API.

13. A computer program product comprising a non-transitory computer readable storage medium having program instructions embodied therewith, the program instructions executable by a processor to cause the processor to perform operations comprising:

sending, by a server, an application programming interface (API) response to a client based on a first API request from the client;

receiving, by the server, a first data consumption record corresponding to the API response, wherein the first data consumption record indicates an amount of data that was discarded from the API response by the client;

determining, by the server, based on the first data consumption record, a lightweight API; and sending, by the server, the lightweight API to the client based on a second API request from the client, wherein one or more data fields that are included in the API response are not included in the lightweight API, and wherein the lightweight API is determined based on a ratio of required data in the API response to the amount of data that was discarded from the API response being below a data consumption threshold.

14. The computer program product of claim 13, comprising:

receiving, by the server, a plurality of data consumption records from the client, each of the plurality of data consumption records being associated with a respective API response;

determining, by the server, a subset of the plurality of data consumption records that are associated with a branch identifier; and determining, by the server, the lightweight API based on the determined subset of the plurality of data consumption records.

15. The computer program product of claim 14, comprising:

sending, by the server, the lightweight API to the client based on the second API request being associated with the branch identifier.

16. The computer program product of claim 13, comprising:

receiving, by the server, a second data consumption record corresponding to the lightweight API, wherein the second data consumption record indicates an amount of data that was discarded from the lightweight API by the client;

determining, by the server, based on the second data consumption record, a second-level lightweight API, wherein one or more data fields that are included in the lightweight API are not included in the second-level lightweight API; and sending, by the server, the second-level lightweight API to the client base on a third API request from the client.

17. The computer program product of claim 13, comprising:

based on the lightweight API not including required data, receiving, by the server, an API request exception corresponding to the second API request from the client; and sending, by the server, a heavy API response to the client based on the API request exception.

* * * * *